July 1, 1958 F. O. E. SCHULTZ 2,841,178
CONTROL VALVE
Filed July 7, 1952

INVENTOR.
FORREST O. E. SCHULTZ
BY
RICHEY, WATTS, EDGERTON & McNENNY
ATTORNEYS

2,841,178
CONTROL VALVE

Forrest O. E. Schultz, Detroit, Mich., assignor to Midland-Ross Corporation, Cleveland, Ohio, a corporation of Ohio Application July 7, 1952, Serial No. 297,586

1 Claim. (Cl. 137—627.5)

This invention relates to suspension systems for vehicles and, more particularly, to a control valve for air spring systems.

An object of the invention is the compensation for changes in body loading and load distribution in vehicles utilizing air-springing systems.

Another object of the invention is the relief of excessive air pressure in air springs upon the unloading of the vehicle.

Another object of the invention is the control of air pressure in air springs in accordance with the movement of the body or axle members of the vehicle.

A still further object of the invention is the control of air pressure in air springs and independently of air supply pressure.

The invention together with further objects and features thereof will be more clearly understood from a consideration of the following detailed specification and claim taken in connection with the appended drawings, in which:

Figure 1:
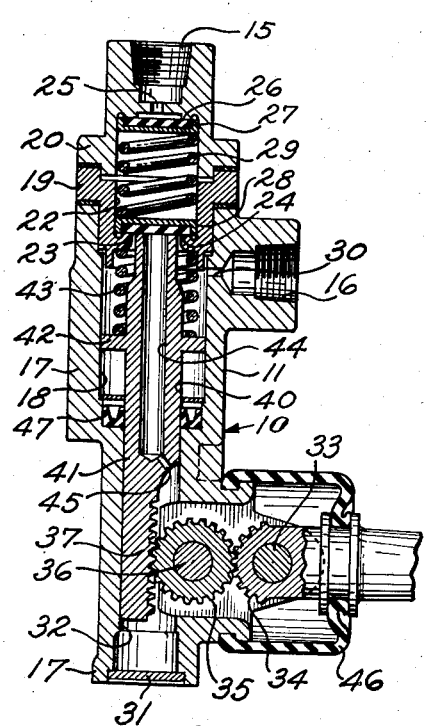
Fig. 1 is a vertical sectional view of the valve of the invention.
Figure 2:
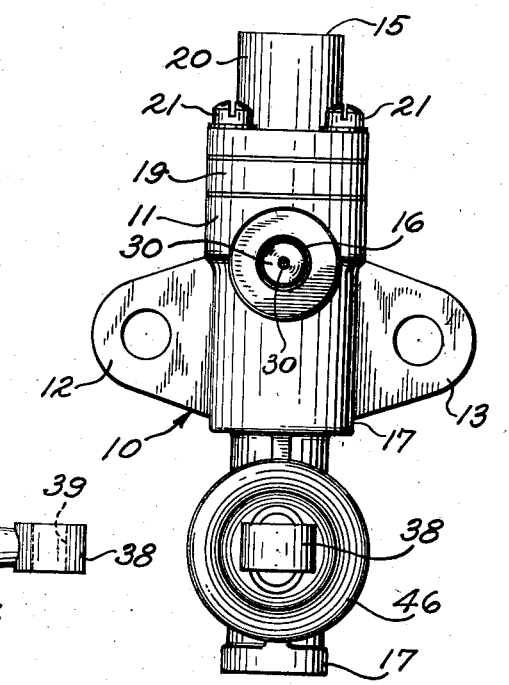
Fig. 2 is a side elevation view.
Figure 3:
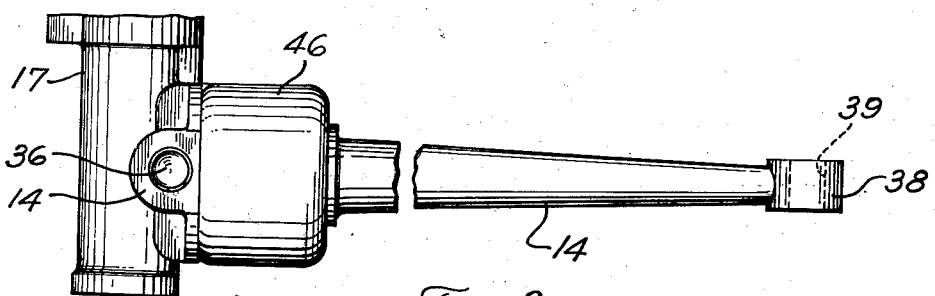
Fig. 3 is a partial front elevation view of the valve of the invention showing particularly the mounting of the valve actuating arm.

Referring now to the figures, the valve 10 of the invention includes a body 11 having support arms 12 and 13 for mounting the valve upon the frame or other body member of an automotive vehicle and an actuating arm 14 adapted to be connected to an axle or other part of the under carriage of the vehicle. The valve 10 includes an inlet 15 for connection to a conventional source of air under pressure and an outlet 16 for connection to an air spring. The valve 10 then is operated by relative movement between the axle and frame of the vehicle and determines the flow of air to and from the air spring in accordance with such movements which may be caused by loading or unloading of the vehicle.

The body 11 of the valve is formed in three parts, the three parts cooperating to form a cylinder and valve housing for the operative components of the valve. A lower body member 17 includes a cylinder opening 18 in the main portion of the body. A central member 19 and an upper end member 20 are secured to the lower body portion 17 by cap screws 21 and are formed on the interior thereof with a valve opening 22. An opening 23 in the lower portion of the body member 19 serves as an inlet port for the cylinder opening and includes a valve seat 24 surrounding the inlet port opening. The body member 20 includes an air inlet port 25 extending between the air inlet 15 and the valve opening 22 and the body member 20 is formed with a valve seat 26 surrounding the opening or port 25.

Valve members or poppets 27 and 28 are adapted to slide in the valve opening 22 and engage the valve seats 24 and 26 to close the associated ports. A valve spring 29 maintains the valve members in normal engagement with the valve seats.

The lower body member 17 includes an outlet port 30 formed in the body and extending between the cylinder opening 18 and the outlet 16. A porous disc 31 is provided at the lower extremity of a piston opening 32 in the lower portion of the lower body member 17. The opening 32 serves as a relief outlet 27 for escape of air from the valve. The lower body member 17 also supports a shaft 33 for the actuating arm 14 which is formed as a segment 34 of a gear at the inner end thereof and rotates upon the shaft. The gear segment 34 engages a pinion 35 similarly mounted upon a shaft 36 supported by the lower body member 17 and in engagement with a pinion rack 37 formed as a part of the lower end of the valve piston 40. The arm 14 includes an enlarged portion 38 at the outer end thereof and an opening 39 for securing the arm to the under carriage of the vehicle.

The piston 40 includes an elongated body portion 41 of lesser diameter than the cylinder opening 18. The body 41 extends into the cylinder opening 32 in the lower body member 17 at one end and through the cylinder inlet port 23 at the opposite end. A land 42 projects from the body 41 of the piston and engages the walls of the cylinder opening 18 which serves with the cylinder opening 32 in the lower portion of the body members as a guide and bearing for the piston.

A spring 43 extending between the land 42 and the body member 19 serves to resist movement of the piston 40 toward the valve end of the cylinder and stabilizes the piston actuating mechanism to obviate excessive wear due to vibration of the vehicle.

An opening 44 extends longitudinally through the body 41 of the piston 40 from the valve end and opens through a passage 45 into the lower portion of the cylinder opening 32 to communicate with the relief valve 31. A diaphragm 46 of rubber or like material forms an air-tight connection between the body member 18 and the actuating arm 14. A seal 47 also prevents escape of air between the body member 18 and the body 41 of the piston 40.

In operation, the pressure of air from the source at the inlet 15 is sufficient to overcome the resistance of the valve spring 29 so that the space within the valve opening 22 is constantly maintained at the same air pressure as the source. If the vehicle is loaded more heavily to increase the deformation of the air spring, the actuating arm is rotated upward, thus causing upward movement of the piston 40. Upon engagement of the upper end of the piston 40 with the valve 28, the valve 28 is unseated, thus allowing air to pass from the valve opening through the cylinder inlet port 23 into the cylinder opening and through the outlet port 30 to the air spring. Air may thus continuously pass from the source to the spring until such time as the vehicle reaches a level position. The actuating arm 14 then closes the valve 28.

Upon downward rotation of the actuating arm 14, as by unloading of the vehicle to permit an excessive distention of the air spring, the piston 40 is moved downwardly and away from the valve 28 thus exposing the upper end of the opening 44. Air is thus allowed to pass from the cylinder 18 through the opening 44 and passage 45 to the piston opening 32 and out the relief outlet. Air continues to escape until such time as sufficient air has left the air spring to return the actuating arm to a level position.

The air inlet valve 26 serves also as a check valve so that in the event that the air source is disconnected, air cannot escape from the spring.

Thus the valve serves the three functions of admitting fluid under pressure into the air spring, holding the fluid in the spring and allowing it to escape from the spring.

It is to be understood that the specific nature of the present disclosure is not intended to be restrictive or confining and that various rearrangements of parts and modifications of design may be resorted to without departing from the scope or spirit of the invention as herein claimed.

What is claimed is:

Apparatus for use with a vehicle having a relatively movable frame and axle and an air spring therebetween, said apparatus comprising a body and an arm adapted to be connected one to the frame and the other to the axle of the vehicle, said arm projecting into and being pivotally connected at its inner end to said body, said body having a chamber provided with an air inlet adapted to be connected to a source of air under pressure, an air outlet adapted to be connected to an air spring, and a piston receiving opening, said outlet having a restricted port, a valve seat in said chamber adjacent to said inlet, a first valve engageable with said seat to control the flow of air from the chamber through the inlet, a valve seat in said chamber between said ports, a second valve engageable with said seat to control the flow of air from said inlet to said outlet, resilient means in the body to urge said valves against their seats, a piston in said chamber and piston receiving opening, packing means in the body to prevent the escape of air through said opening around said piston, said piston having an exhaust passage extending therethrough from an open end which is closeable by engagement of said open end with said second valve, and means for automatically maintaining said body and said arm in predetermined relative position, said means including a member in the body engaging the inner end of said arm and adapted to be moved by relative pivotal movement of said body and arm and engaging and adapted to move said piston, said movable member serving when the arm moves in one direction to move said piston to an air inlet position in which the piston engages and moves said second valve off its seat, and when the arm moves in the opposite direction to move said piston to an air exhaust position in which the piston is out of contact with the second valve, the valve is on its seat and the passage through the piston is open to permit escape of air therethrough from said outlet and when the body and arm are moved to an intermediate predetermined position, to move the piston to and maintain it in a hold position in which the open end of the piston is in engagement with said valve and the valve is on its seat.

References Cited in the file of this patent

UNITED STATES PATENTS

| | | |
|---|---|---|
| 1,105,805 | Liebowitz | Aug. 14, 1914 |
| 1,271,805 | Thurber | July 9, 1918 |
| 1,555,072 | Patton | Sept. 29, 1925 |
| 1,612,406 | Weisgerber | Dec. 28, 1926 |
| 1,664,510 | Hughes | Apr. 3, 1928 |
| 1,722,985 | Kling | July 30, 1929 |
| 1,733,441 | Barks | Oct. 29, 1929 |
| 1,747,910 | Siefarth | Feb. 18, 1930 |
| 2,021,043 | Bedford | Nov. 12, 1935 |
| 2,171,316 | Van Sittert | Aug. 29, 1939 |
| 2,197,922 | Cerstrik | Apr. 23, 1940 |
| 2,213,488 | Dowrick | Sept. 3, 1940 |
| 2,271,151 | Fina | Jan. 27, 1942 |
| 2,335,824 | Dillman | Nov. 30, 1943 |
| 2,653,624 | Klessig | Sept. 29, 1953 |
| 2,656,014 | Fites | Oct. 20, 1953 |

FOREIGN PATENTS

| | | |
|---|---|---|
| 856,204 | France | of 1940 |